United States Patent
Bastide et al.

(10) Patent No.: US 10,742,576 B2
(45) Date of Patent: *Aug. 11, 2020

(54) EMBEDDING ACTIONABLE CONTENT IN ELECTRONIC COMMUNICATION

(71) Applicant: International Business Machines Corporation, Armonk, NY (US)

(72) Inventors: Paul R. Bastide, Ashland, MA (US); Matthew E. Broomhall, Goffstown, NH (US); Robert E. Loredo, North Miami Beach, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/281,446

(22) Filed: Feb. 21, 2019

(65) Prior Publication Data

US 2019/0190864 A1    Jun. 20, 2019

Related U.S. Application Data

(63) Continuation of application No. 13/900,238, filed on May 22, 2013, now Pat. No. 10,277,542, which is a continuation of application No. 13/898,342, filed on May 20, 2013, now Pat. No. 10,291,562.

(51) Int. Cl.
*H04L 12/58*     (2006.01)
(52) U.S. Cl.
CPC .......... *H04L 51/08* (2013.01); *H04L 51/066* (2013.01); *H04L 51/10* (2013.01)

(58) Field of Classification Search
CPC ........ H04L 51/08; H04L 51/066; H04L 51/10
USPC ....................................................... 709/226
See application file for complete search history.

(56) References Cited

U.S. PATENT DOCUMENTS

| | | | |
|---|---|---|---|
| 5,889,943 A | 3/1999 | Ji et al. | |
| 6,457,879 B1 | 10/2002 | Thurlow et al. | |
| 7,707,591 B2 | 4/2010 | Curry et al. | |
| 2004/0205133 A1 | 10/2004 | Adler | |
| 2005/0097176 A1 | 5/2005 | Schatz et al. | |
| 2006/0293031 A1 | 12/2006 | Clarke et al. | |
| 2007/0038717 A1 | 2/2007 | Burkholder et al. | |
| 2009/0030991 A1 | 1/2009 | Vakkalanka | |
| 2009/0094339 A1 | 4/2009 | Allen et al. | |
| 2009/0192900 A1 | 7/2009 | Collison et al. | |
| 2011/0099507 A1 | 4/2011 | Nesladek et al. | |
| 2011/0179362 A1* | 7/2011 | Craddock | H04L 51/08 715/752 |
| 2011/0289170 A1 | 11/2011 | Smith et al. | |
| 2012/0290945 A1* | 11/2012 | Byrne | G06Q 50/32 715/752 |
| 2013/0030922 A1 | 1/2013 | Shalabi et al. | |
| 2014/0040770 A1* | 2/2014 | Khoo | G06F 3/0482 715/752 |
| 2015/0026279 A1* | 1/2015 | Casanova | H04L 51/10 709/206 |

* cited by examiner

*Primary Examiner* — James E Springer
*Assistant Examiner* — Patrick F Ngankam
(74) *Attorney, Agent, or Firm* — Fabian VanCott; Steven L. Nichols

(57) ABSTRACT

Embedding actionable content in electronic communication comprises associating an embedding gadget with an electronic message and modifying the electronic message based on the embedding gadget.

20 Claims, 4 Drawing Sheets

| Library | | |
|---|---|---|
| Electronic Messages 302 | General Gadgets 304 | Specific Gadgets 306 |
| Electronic Message A 302-1 | General Gadget A 304-1 | No Specific Gadget 306-1 |
| Electronic Message B 302-2 | No General Gadget 304-2 | Specific Gadget B 306-2 |
| Electronic Message C 302-3 | General Gadget C 304-3 | Specific Gadget C 306-3 |

EMBEDDING ACTIONABLE CONTENT IN ELECTRONIC COMMUNICATION

RELATED APPLICATIONS

The present application is a continuation of and claims priority under 35 U.S.C. § 120 to U.S. application Ser. No. 13/900,238 filed May 22, 2013, entitled "EMBEDDING ACTIONABLE CONTENT IN ELECTRONIC COMMUNICATION," which is a continuation of and claims priority under 35 U.S.C. § 120 to U.S. application Ser. No. 13/898,342 filed May 20, 2013, entitled "EMBEDDING ACTIONABLE CONTENT IN ELECTRONIC COMMUNICATION," which are incorporated herein by reference in their entireties.

BACKGROUND

The present invention relates to embedding actionable content in electronic communication, and more specifically, to embedding actionable content in electronic messages.

Networks use service mail providers and electronic message applications to allow a user, using a user device, to transmit, access, upload, and retrieve electronic communication. A service mail provider may use servers to store electronic communication such as electronic messages. An electronic message may include textual, graphical, or other digital information that allows one user to communicate with another user, run active content, or present a number of views of the electronic message. The views of the electronic message may be text, hypertext markup language (HTML), multi-purpose internet mail extension (MIME), and combinations thereof. Further, electronic messages may be sent to multiple recipients across the world in seconds.

BRIEF SUMMARY

A computer program product includes a computer readable storage medium, the computer readable storage medium having computer readable program code embodied therewith. The computer readable program code having computer readable program code to associate an embedding gadget with an electronic message and to modify the electronic message based on the embedding gadget.

A system for embedding actionable content in electronic communication includes a detection engine to detect that an electronic message has been sent to a recipient, an identification engine to identify service identifiers in the electronic message, an association engine to associate an embedding gadget with the electronic message, and a modification engine to modify the electronic message based on the embedding gadget.

A system for embedding actionable content in electronic communication includes an identification engine to identify service identifiers in an electronic message, an association engine to associate an embedding gadget with the electronic message, and a modification engine to modify the electronic message based on the embedding gadget.

A method for embedding actionable content in electronic communication includes associating an embedding gadget with an electronic message and modifying the electronic message based on the embedding gadget.

A method for embedding actionable content in electronic communication includes detecting that an electronic message has been sent to a recipient, identifying specific service identifiers in the electronic message, associating an embedding gadget with the electronic message, modifying the electronic message based on the embedding gadget, and transmitting the modified electronic message based on the embedding gadget.

A method for embedding actionable content in electronic communication includes associating an embedding gadget with the electronic message, modifying the electronic message based on the embedding gadget, and transmitting the modified electronic message based on the embedding gadget.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
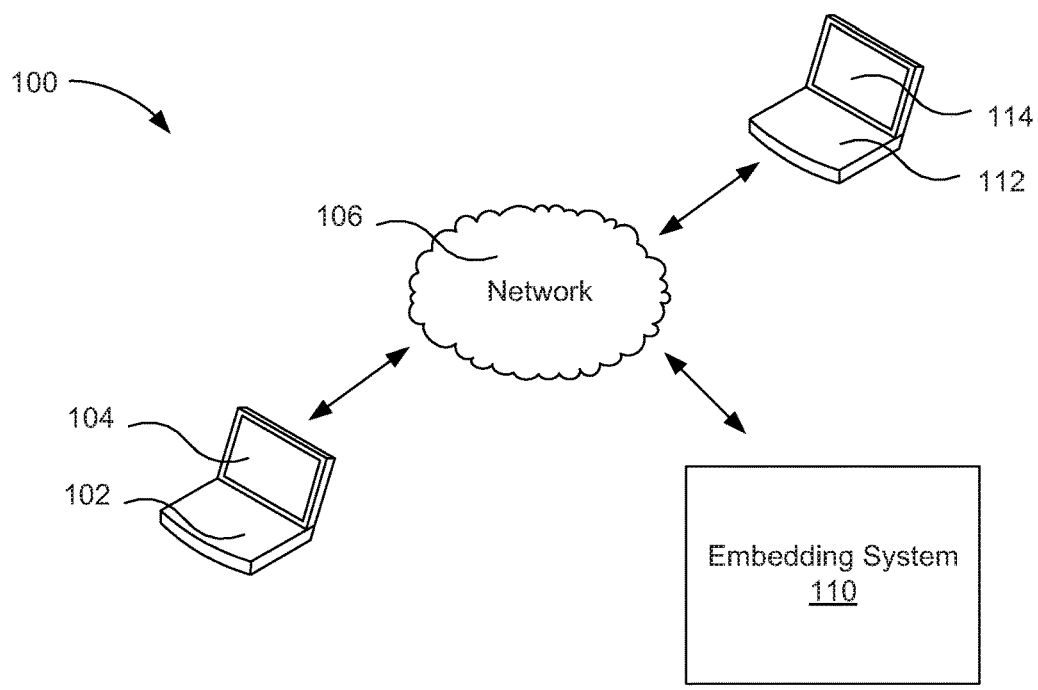
FIG. 1 is a diagram of an example of a system for embedding actionable content in electronic communication, according to one example of principles described herein.

The present specification describes a method and system for embedding actionable content in electronic communication such that interactivity with the actionable content is within an electronic message application. The present specification also describes a method and system for associating an embedding gadget with an electronic message such that the embedding gadget allows a user to interact with embedded actionable content within an electronic message.

As will be appreciated by one skilled in the art, aspects of the present specification may be embodied as a system, method, or computer program product. Accordingly, aspects of the present specification may take the form of hardware or a combination of hardware and software. Furthermore, aspects of the present specification may take the form of a computer program product embodied in a number of computer readable mediums having computer readable program code embodied therein.

Any combination of computer readable medium(s) may be utilized. A computer readable storage medium may be, for example, but not limited to, an electronic, magnetic, optical electromagnetic, infrared, or semiconductor system, apparatus, or device or any suitable combination of the foregoing. More specific examples (a non-exhaustive list) of the computer readable mediums would include the following: an electrical connection having a number of wires, a portable computer diskette, a hard disk, a random access memory (RAM), a read-only memory (ROM), an erasable programmable read-only memory (EPROP or Flash memory), an optical fiber, a portable compact disk read-only memory (CD-ROM), an optical storage device, a magnetic storage device, or any suitable combination of the foregoing. In the context of this document, a computer readable storage medium may be any tangible medium that can contain, or store a program for use by or in connection with any instruction execution system, apparatus, or device such as, for example, a processor.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations of the present specification may be written in an object oriented programming language such as Java, Smalltalk. or C++, among others. However, the computer program code for carrying out operations of the present systems and methods may also be written in procedural programming languages, such as, for example, the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, thought the internet using an internet service provider).

Flowchart illustrations and/or block diagrams of methods, apparatus, and computer program products are disclosed. Each block of the flowchart illustrations and/or block diagrams, and combinations of blocks in the flowchart illustrations and/or block diagrams, can be implemented by computer program instructions. These computer program instructions may be provided to a processor or other programmable data processing apparatus to produce a machine, such that the instructions, which execute via a processor of the computer or other programmable data processing apparatus, implement the functions/acts specified in the flowchart and/or block diagram block or blocks.

In one example, these computer program instructions may be stored in a computer-readable memory that can direct a computer or other programmable data processing apparatus to function in a particular manner, such that the instructions stored in the computer-readable memory produce an article of manufacture including instructions which implement the functions/act specified in the flowchart and/or block diagram blocks or blocks.

The computer program instructions may also be loaded onto a computer or other programmable data processing apparatus to cause a series of operations to be performed on the computer or other programmable apparatus to produce a computer implement process such that the instructions which execute on the computer or other programmable apparatus implement the functions/acts specified in the flowchart and/or block diagram blocks or blocks.

Electronic message applications allow a service machine to send and receive electronic messages. An electronic message may include a body where a service machine types a message, adds a hyperlink or uniform resource locator (URL) to the body of the electronic message, and/or attaches a file to the electronic message. The electronic message may be electronic mail (email), instant messaging message, a texting message, a social networking message, a blog post, an electronic comment, another type of message, or combinations thereof. Once an electronic message has been composed, the service machine can send the electronic message to a desired recipient. In response to sending the electronic message, the electronic message can be received by the recipient. An electronic message may be sent to hundreds of recipients. Further, the recipients may read the electronic message, open the attached file, or select the hyperlink and/or URL in the body of the electronic message. In response to selecting the hyperlink or URL, the recipient may be directed to a web server of the hyperlink or URL via a user's web browser.

Although the recipient of the electronic communication is able to interact with the actionable content, such as the contents of the hyperlink or URL, the recipient still has to go to the address of the URL or hyperlink to see the contents of the actionable content. As a result, the actionable content may not be viewed within a service provider's electronic message application. In some circumstances, the recipient may decide to not view the actionable content. In such a circumstance, the sender's desire for the recipient to view the actionable content is not realized.

The principles described herein include a system and a method to embed actionable content in electronic communication. Such a system and method can embed actionable content found at the address of the hyperlink or URL. Further, the actionable content is embedded in the electronic message when the electronic message is received. By embedding the contents of the actionable content automatically when the recipient receives the electronic message, the recipient does not have to leave a service provider's electronic message application to receive the information of the actionable content. Further, the sender does not have to copy the contents of the actionable content into the electronic message either. As a result, both the sender and the recipient are saved time and effort from having to fetch the contents of the actionable content by not leaving a service provider's electronic message application. In one example, actionable content is embedded into an electronic message to reference an experience, such as a task for a user to complete. A task may be a set of procedures assigned to a user to complete. For example, an organization may use electronic messages to assign users with a number of tasks to complete. By embedding the actionable content in the electronic messages, the users do not have to leave a service provider's electronic message application in order to complete the tasks. As a result, the embedded actionable content in the electronic message allows the users to experience enhanced workflow to complete each task within the service provider's electronic message application. More detail about the system and the method will be described below.

In one example, a system for embedding actionable content in electronic communication includes an embedding system. The embedding system is in communication with a network, and the embedding system embeds actionable content in the electronic communication after the electronic communication is sent to a recipient. The actionable content to be embedded in the electronic communications is the actionable content at the locations that are described by the hyperlink and/or URL. As a result, a sender can insert a URL into an electronic message, and the embedding system will embed the actionable content located at the URL's address into the electronic message after the user indicates that the electronic message is to be sent. The recipient of the electronic message sees the contents of the actionable content in the received electronic message. As a result, the recipient does not have to separately look up the actionable content because the embedding system has already provided the recipient with the contents of the actionable content in the electronic message. This saves the recipient time and also gives the sender a higher confidence that the recipient will actually see the contents of the actionable content.

Further, embedding actionable content in electronic communication includes associating an embedding gadget with an electronic message and modifying the electronic message based on the embedding gadget. The embedding system associates an embedding gadget that causes the embedding system to embed the appropriate actionable content in the electronic message. In one example, associating an embedding gadget with an electronic message may include embedding a specific gadget for a specific circumstance into the electronic message based on the electronic message. A specific gadget may be a program application to allow a user to interact with embedded actionable content within an electronic message. In another example, associating an embedding gadget with an electronic message may include embedding a general gadget from a library into an electronic message. A general gadget may be a program application, written for a wide variety of electronic messages, to allow a user to interact with embedded actionable content within an electronic message.

Further, the embedding system modifies the electronic message based on the embedding gadget by embedding the appropriate actionable content. The modified electronic message replaces at least a portion of the body of the electronic message with the actionable contents located at the URL in the electronic message. As a result, the modified electronic message allows a user to interact with the embedded actionable content within the electronic message application.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1 is a diagram of an example of a system for embedding actionable content in electronic communication, according to one example of principles described herein. As mentioned above, an embedding system is in communication with a network to embed actionable content in electronic communication. The embedding system may retrieve content of an embedded actionable content, such as the content of a URL or hyperlink, from the network and embed the content associated with the actionable content into the body of the electronic message. Further, the electronic communication with the embedded file may be viewed on a display on a user device.

In one example, the system (100) includes a first user device (102) with a display (104). In this example, a user uses the first user device (102) to access a network (106). Further, the display (104) displays electronic communication from the network (106) using an electronic message application. In one example, the network (106) may include an electronic message server. In this example, the electronic message server stores, in memory, electronic messages sent from the first user device (102) to a second user device (112). As will be described below, the embedding system (110) retrieves content of an embedded actionable content, such as a URL or hyperlink, from the network (106) and embeds the content associated with the embedded actionable content into the body of the electronic message. As a result, the embedding system (110) allows a user to interact with the embedded actionable content within the electronic message application.

As mentioned above, actionable content is embedded into an electronic message to reference an experience, such as tasks, for a user. In one example, an organization uses electronic messages to assign users with a number of tasks. By embedding the actionable content into an electronic message, the users do not have to leave a service provider's electronic message application in order to complete the tasks. As a result, if a user is assigned three tasks in three separate electronic messages, the user can complete each of the three tasks without leaving the serviced provider's electronic message application. Because, the user can complete each of the three tasks without leaving the serviced provider's electronic message application, the user can experience enhanced workflow.

The system (100) further includes an embedding system (110). In one example, the embedding system (110) retrieves content of an embedded actionable content, such as a URL or hyperlink, from the network (106) and embeds the content associated with the actionable content into the body of the electronic message before the electronic message is received by a recipient. In another example, the embedding system (110) retrieves content of an embedded actionable content, such as a URL or hyperlink, from the network (106) and embeds the content associated with the actionable content into the body of the electronic message when the electronic message is received by a recipient. As will be described below, the embedding system (110) detects that an electronic message has been sent to a recipient. Specifically, in this example, the embedding system (110) detects that a service mail message has been sent from the first user device (102). The embedding system (110) also identifies specific service identifiers in the electronic message. Next, the embedding system (110) references a library to associate an embedding gadget with the electronic message. As will be described below, an embedding gadget may be a general gadget for a general electronic message, or the embedding gadget may be a specific gadget message for a specific electronic message. The electronic message is modified such that the embedding gadget embeds any file associated with the electronic message into the body of the electronic message. Finally, the embedding system (110) transmits the modified electronic message based on the embedding gadget. In this example, the modified electronic message is transmitted to the second user device (112). As a result, the embedding system (110) allows a user to interact with the embedded actionable content within the electronic message. The embedding system (110) will be described in more detail below.

In one example, a user sends an electronic message from a first user device (102) where it is received by another user using a second user device (112). In keeping with the given example, the electronic message sent from the first user device (102) has an active hyperlink associated with a video from a web server on the network (106). When the electronic message is sent from the first user device (102), the embedding system (110) detects the electronic message being sent as a trigger. As a result, the embedding system (110) detects the active hyperlink and associates the active hyperlink to a series of embedding gadgets which may be used to render the electronic message. Based on the embedding gadget associated with the electronic message, the electronic message is modified by replacing at least a portion of the body of the electronic message with the embedding gadget and a specific service identifier. The embedding system (110) transmits the modified electronic message to the second user device (112). As a result, the user of the second user device (112) views the content associated with the actionable content in the body of the electronic message on the second user device (112) via a display (114). Further, the embedding system (110) allows a user to interact with the embedded actionable content within the electronic message. More detail about the embedding system (110) and the method will be described below.

The principles described herein are well suited for electronic communication applications that are used on user devices. However, any appropriate field of use may incorporate the principles described herein. For example, the principles described herein may also be used in email applications, instant messaging applications, or combinations thereof.

While this example has been described with reference to the embedding system being located over the network, the embedding system may be located in any appropriate location according to the principles described herein. For example, the embedding system may be located on a user device. In some examples, the embedding system embeds just the actionable content that is displayed with the user device. In other examples, embedding system embeds the actionable content displayed on other user devices of a network. In yet other examples, the embedding system can embed actionable content displayed on some user device specific programs or network programs while not in other programs. For example, the embedding system may embed the actionable content of electronic message application in one electronic communication program while not embedding the actionable content of the electronic message application in another electronic communication program.

While this example has been described with reference to the embedding system embedding actionable content in an electronic message before the electronic message is received by a recipient, the actionable content may be embedded when the electronic message is received by a recipient. For example, the actionable content may be embedded by the recipient's user device, a service provider's electronic message application, or combinations thereof.

Figure 2:
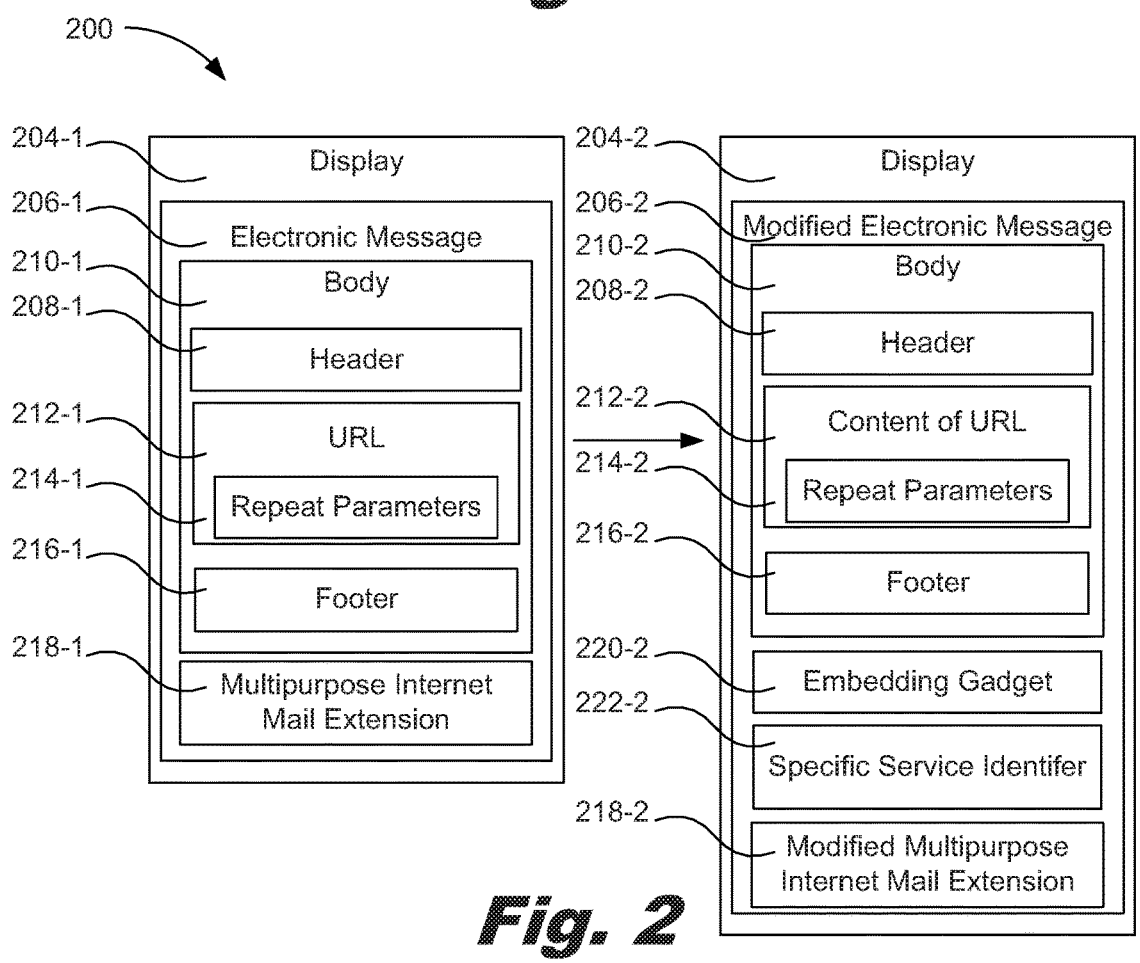
FIG. 2 is a diagram of an example of an electronic message, according to the principles described herein.

FIG. 2 is a diagram of an example of an electronic message, according to the principles described herein. An electronic message may be viewed on a display on a user device, such as a mobile device, like a phone, electronic tablet, notebook, watch, another mobile device, or combinations thereof. As mentioned above, an embedding system is used to modify an electronic message based on an embedding gadget by embedding the appropriate actionable content. The modified electronic message replaces at least a portion of the body of the electronic message with the contents located at the URL in the electronic message. As a result, this allows a user to interact with embedded actionable content within the electronic message application.

Turning specifically to FIG. 2, an electronic message (206-1) may include a multi-purpose internet mail extension (MIME) (218-1). A MIME is an internet standard that extends the format of electronic communication support. In one example, a MIME message (218-1) may contain a header (208-1) of an electronic message (206-1), a footer (216-1) of an electronic message (206-1), or combinations thereof. In another example, the MIME (218-1) is not in a header (208-1) or footer (216-1) of an electronic message (206-1). As mentioned above, an electronic message (206-1) may include a body (210-1) where the user types a message, adds a hyperlink or a URL (212-1) to the body of the electronic message, and/or attaches a file to the electronic message. As mentioned above, the embedding system embeds actionable content in the electronic communication after the electronic communication is sent and before a recipient receives the electronic message. In this example, the actionable content to be embedded in the electronic communication is the actionable content at the locations that are described by the URL (212-1). As a result, a sender can insert a URL (212-1) into the electronic message (206-1), and the embedding system embeds the actionable content located at the URL's (212-1) address into the electronic message (206-1) after the user indicates that the electronic message is to be sent.

In keeping with the given example, the embedding system modifies the electronic message (206-1) based on an embedding gadget (220-2) by embedding content of the URL (212-2) into the body (210-2) of the modified electronic message (206-2). The modified electronic message (206-2) replaces at least a portion of the body (210-2) of the modified electronic message (206-2) with the contents of the URL (212-2) in the modified electronic message (206-2). Further, the modified electronic message (206-2) includes a specific service identifier (222-2) and a modified MIME (218-2). More detail about the specific service identifier (222-2) and the modified MIME (218-2) will be described below. As a result, a recipient of the electronic message sees the contents of the actionable content in the received modified electronic message (206-2). The recipient does not have to separately look up the actionable content because the embedding system has already provided the recipient with the actionable contents in the electronic message. Thus, the modified electronic message (206-2) allows a user to interact with embedded actionable content within the electronic message application.

Figures 3, 4:
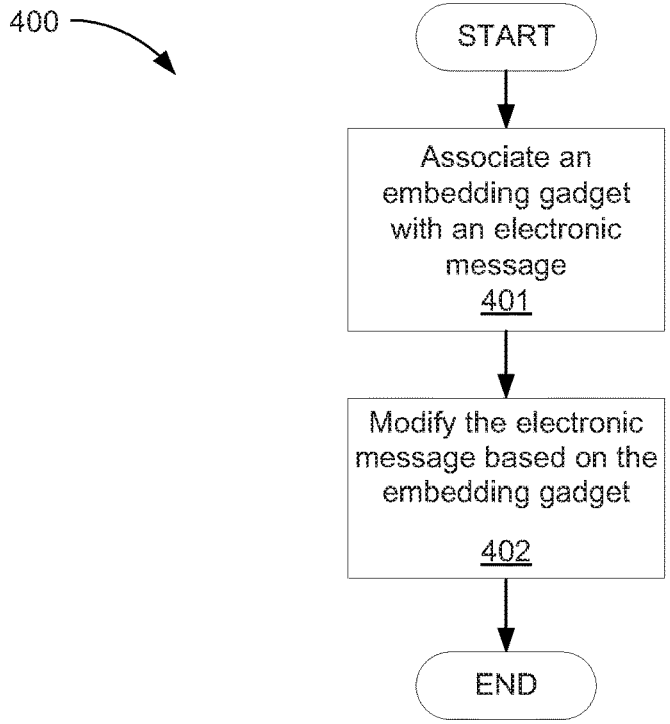
FIG. 3 is a diagram of an example of a library, according to the principles described herein.
FIG. 4 is a flowchart of an example of a method for embedding actionable content in electronic communication, according to one example of principles described herein.

FIG. 3 is a diagram of an example of a library, according to the principles described herein. As mentioned above, the embedding system references a library (300) that includes electronic messages (302). In one example, the electronic messages (302) are service mail messages. The library (300) includes general gadgets (304) associated with the electronic messages (302). The library (300) also includes specific gadgets (206) associated with the electronic messages (302).

Turning specifically to FIG. 3, the library (300) includes specific types of electronic messages (302) such as electronic message A (302-1), electronic message B (302-2), electronic message C (302-3). In one example, the electronic messages (302) have been identified as service mail messages using an embedding system (FIG. 1, 110). More detail about identifying electronic messages as service mail messages is described below. Although the library (300) includes three electronic messages (302), in practice a library may include thousands of electronic messages (302).

Further, the electronic messages (302) have embedding gadgets such as a general gadget (304) associated with each electronic message (302) and/or a specific gadget (306) associated with each electronic message (302). For example, electronic message A (302-1) has a general gadget A (304-1).

As a result, if an electronic message is identified to have characteristics comparable to electronic message A (302-1), the embedding system (FIG. 1, 110) may use the general gadget A (304-1) to embed actionable content in the electronic message. Alternatively, if the characteristics of the electronic message are not comparable to any electronic message (302), an embedding gadget may be generated and used to embed actionable content in the electronic message. In keeping with the given example, an electronic message is received that is not comparable to any electronic message (302), but is similar to electronic message A (302-1). Further, electronic message A (302-1) does not have a specific gadget (306-1) stored in the library (300). As a result, an embedding gadget may be generated and may be used to embed actionable content in the electronic message. Further, the specific gadget may then be stored in the library (300). Alternatively, if the specific gadget is very specific and is not likely to be used again, the general gadget may not be stored in the library (300).

In another example, electronic message B (302-2) does not have a general gadget (304-2). As a result, if the characteristics of an electronic message are identified to be comparable to electronic message B (302-2), the electronic message may generate an embedding gadget to embed actionable content in the electronic message. In this example, the specific gadget is stored in the library (300) as specific gadget B (306-2). As a result, the specific gadget B (306-2) can be used again if the characteristics of an electronic message are identified to be comparable to electronic message B (302-2).

In still another example, electronic message C (302-3) has a general gadget C (304-3) and a specific gadget C (306-3). As a result, if the characteristics of an electronic message are identified to be comparable to electronic message C (302-3), the electronic message may use the general gadget C (304-3) to embed actionable content in the electronic message or the specific gadget C (306-3) may be used to embed actionable content in the electronic message.

Additionally, an embedding gadget can be installed locally or accessed over a network. Further, the embedding gadget can be designed to provide interactive content and functionality within an electronic message. In one example, once an embedding gadget is used for an electronic message, the embedding gadget can be designed to interact with other computer components. For example, a user may receive an electronic message that includes hyperlinks. Using the embedding gadget, the embedding gadget may retrieve content of an embedded actionable content, such as a hyperlink, from the network and embed the content associated with the actionable content into the body of the electronic message.

Further, a user may select an embedding gadget to be used to embed actionable content associated with an electronic message. For example, if a general gadget (304) and a specific gadget (306) are stored in the library (300) for an electronic message, the user may select the embedding gadget to be used to embed actionable content associated with an electronic message. In another example, the embedding system (FIG. 1, 110) may select an embedding gadget to be used to embed actionable content associated with an electronic message. For example, if a general gadget (304) and a specific gadget (306) are stored in the library (300) for an electronic message, the embedding system (FIG. 1, 110) may select a general gadget (304) to be used to embed actionable content associated with an electronic message.

FIG. 4 is a flowchart of an example of a method for embedding actionable content in electronic communication, according to one example of principles described herein. As mentioned above, an embedding system is used to embed actionable content in electronic communication. The method (400) for embedding actionable content in electronic communication includes associating (401) an embedding gadget with an electronic message and modifying (402) the electronic message based on the embedding gadget.

As mentioned above, the embedding system references a library (FIG. 3, 300) that includes electronic messages (FIG. 3, 302) identified as service mail messages. The library (FIG. 3, 300) includes embedding gadgets such as general gadgets (FIG. 3, 304) associated with the electronic messages (FIG. 3, 302). The library (FIG. 3, 300) also includes embedding gadgets such as specific gadgets (FIG. 3, 306) associated with the electronic messages (FIG. 3, 302).

Turning specifically to FIG. 4, associating (401) an embedding gadget with an electronic message may include associating a specific gadget for a specific circumstance to the electronic message base on the electronic message. Further, associating (401) an embedding gadget with an electronic message may include associating a general gadget from a library designed for a wide variety of electronic messages to the electronic message. As a result, an embedding gadget is associated with an electronic message.

In one example, an embedding gadget may be associated with an electronic message by how an embedding gadget responds to the contents of the actionable content to be embedded in the electronic message. For example, an electronic message that has a URL may use one type of an embedding gadget while an electronic message that uses HTML may use another type of an embedding gadget. As a result, an embedding gadget is associated with an electronic message to embed actionable content into the body of the electronic message. Further, an embedding gadget that is associated with an electronic message is used to modify the electronic message. In one example, embedded HTML is active on a server and is dynamic in nature. As a result, a modified electronic message may modify the embedded HTML in the electronic message.

Modifying (402) the electronic message based on the embedding gadget may include modifying (402) the electronic message to include a modified MIME type. In one example, a modified electronic message may include a MIME header. The presence of the MIME header indicates that an electronic message is MIME formatted. In another example, a modified electronic message may include a MIME multipart message. The MIME multipart message may include boundaries for content type in the body of the electronic message. As a result, the embedding system (FIG. 1, 110) selects an embedding gadget based on a MIME header, MIME multipart message, or combinations thereof.

Further, modifying (402) the electronic message based on the embedding gadget may include a specific service identifier. A specific service identifier is used to guarantee that the specific service identifier for a particular electronic message is unique among all other identifiers used for electronic messages. As a result, a modified electronic message may include a number of specific service identifiers.

In one example, modifying (402) electronic message based on the embedding gadget may include HTML markup in the electronic message. In another example, modifying (402) electronic message based on the embedding gadget may include a markup document to be embedded in the electronic message.

Additionally, modifying (402) the electronic message based on the embedding gadget may include replacing at least a portion of the body of the electronic message with a uniform resource locator (URL) pointing to the embedding gadget associated with the electronic message and the specific service identifier. Further, modifying (402) the electronic message based on the embedding gadget may reduce the size of the electronic message. In one example, reducing the size of the electronic message allows an electronic message application on a mobile device to obtain an electronic message faster because less data is used to obtain the electronic message. As a result, the electronic message is modified (402) based on an embedding gadget.

Figure 5:
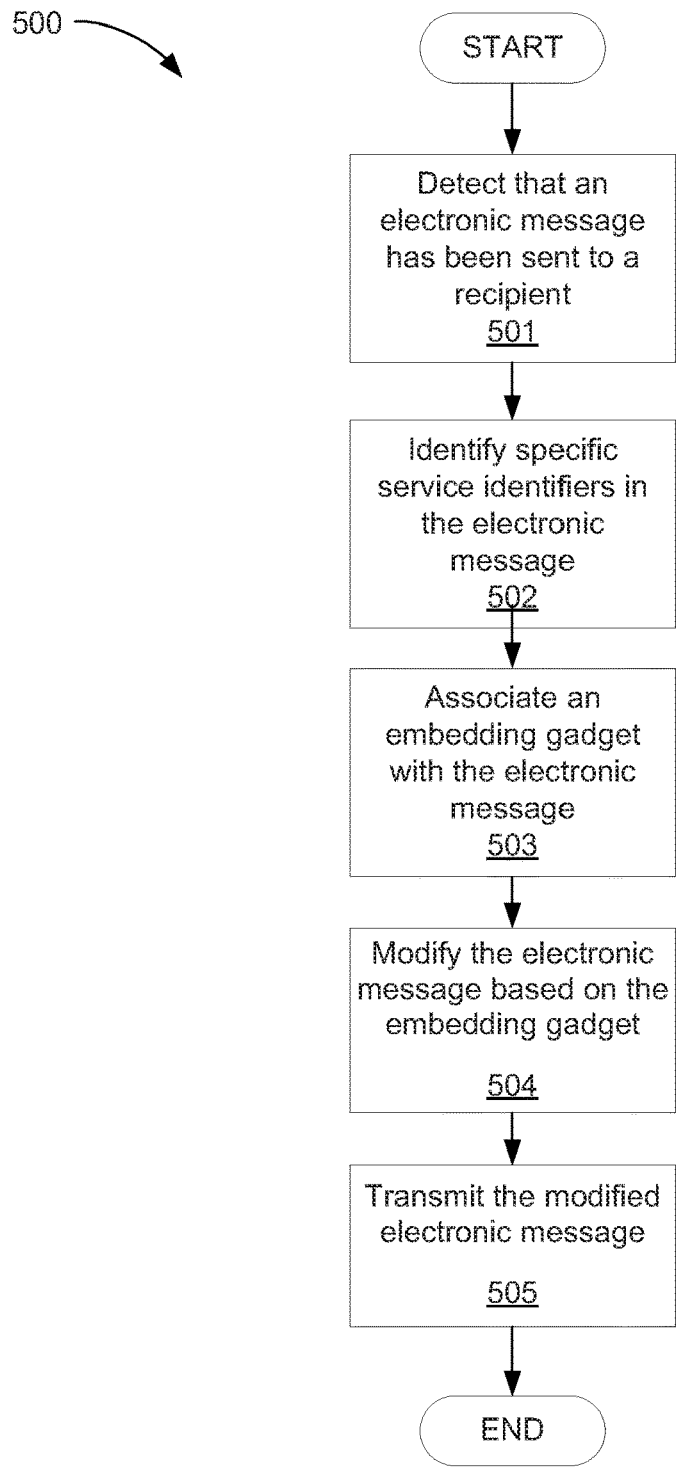
FIG. 5 is a flowchart of an example of a method for embedding actionable content in electronic communication, according to one example of principles described herein.

FIG. 5 is a flowchart of an example of a method for embedding actionable content in electronic communication, according to one example of principles described herein. As mentioned above, an embedding system is used to embed actionable content in electronic communication. The method for embedding actionable content in electronic communication includes detecting (501) that an electronic message has been sent to a recipient, identifying (502) specific service identifiers in the electronic message, associating (503) an embedding gadget with the electronic message, modifying (504) an electronic message based on the embedding gadget, and transmitting (505) the modified electronic message.

As mentioned above, when an electronic message is sent from a user device, an embedding system detects the electronic message as a trigger. Turning specifically to FIG. 5, in one example, detecting (501) that an electronic message has been sent to a recipient includes determining attributes in an electronic message to verify if the electronic message is a service mail message. Determining the attributes in a service mail message allows the embedding system to determine if the electronic message includes actionable content or not. In one example, attributes of a service mail messages may include a header or a footer in the body of the electronic message indicating that the electronic message is a service mail message. In another example, a return-to function in an electronic message is unaddressed or set to other email addresses may be used to determine attributes in an electronic message. In yet another example, a lookup table for electronic communication may include service mail message. As a result if an electronic message uses the lookup table, the lookup table may be used to determine attributes in an electronic message. In still another example, templates such as set and repeated formats in an electronic message may be used to determine attributes in an electronic message to detect that a service mail message has been sent (501) to a recipient. While the above examples include separate examples, any combinations of the above examples may be used to detect that a service mail message has been sent (501) to a recipient. Once an electronic message is detected (501) as being sent, the embedding system identifies specific service identifiers in the electronic message.

Identifying (502) specific service identifiers in the electronic message includes identifying specific service identifiers such as repeated parameters (214-1, 214-2) on URL components. In one example, specific service identifiers such as specific identifiers in a MIME component. In another example, specific service identifiers such as specific service identifiers in the body of the electronic message are identified. In yet another example, specific service identifiers such as a user selected area of the specific service identifier are identified. While the above examples include separate examples to identify specific service identifiers in the electronic message, any combinations of the above examples may be used identify specific service identifiers in the electronic message. Further, in one example, a service machine may be used to identify specific service identifiers in the electronic message. In another example, an embedding system is used to identify specific service identifiers in the electronic message.

As mentioned above, an embedding gadget is associated with an electronic message and the electronic message is modified based on the embedding gadget. The modified electronic message is then transmitted (505). In one example, the size of the electronic message is reduced before the electronic message is transmitted. As a result, reducing the size of the electronic message allows an electronic message application on a mobile device to obtain an electronic message faster because less data is used to obtain the electronic message. In one example, the modified electronic message is transmitted (505) to a specific user device. In another example, the modified electronic message is transmitted (505) to an email server. The email server receives the modified electronic message. In this example, the email server stores, in memory, the modified electronic message. A user may access the modified electronic message using a user device as described above.

Figure 6:
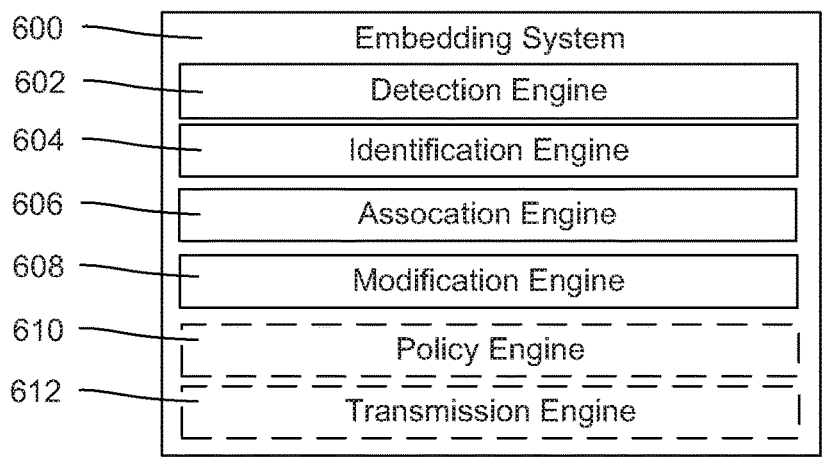
FIG. 6 is a diagram of an example of an embedding system, according to the principles described herein.

FIG. 6 is a diagram of an example of an embedding system (600), according to the principles described herein. The embedding system (600) includes a detection engine (602), an identification engine (604), an association engine (606), and a modification engine (608). In this example, the embedding system (600) also includes a policy engine (610) and a transmission engine (612). The engines (602, 604, 606, 608, 610, 612) refer to a combination of hardware and program instructions to perform a designated function. Each of the engines (602, 604, 606, 608, 610, 612) may include a processor and memory. The program instructions are stored in the memory and cause the processor to execute the designated function of the engine.

The detection engine (602) detects that an electronic message has been sent to a recipient. As mentioned above, when an electronic message is sent from a user device, the embedding system detects the electronic message as a trigger. In one example, the detection engine (602) detects that an electronic message has been sent by determining attributes in an electronic message to verify if the electronic message is a service mail message. As mentioned above, attributes of a service mail messages may include a header or a footer in the body of the electronic message indicating that the electronic message is a service mail message. Further, a return-to function in an electronic message is unaddressed or set to other email addresses may be used to determine attributes in an electronic message. Still further, a lookup table may be used to determine attributes in an electronic message. In one example, a lookup table may include a number of service mail messages. As a result if an electronic message uses the lookup table, the lookup table may be used to determine attributes in the electronic message. Even still further, templates such as set and repeated formats in an electronic message may be used to determine attributes in an electronic message to detect that a service mail message has been sent to a recipient. As a result, the detection engine (602) detects that an electronic message has been sent using attributes in an electronic message. In another example, the detection engine (602) uses polling to identify an electronic message as a service mail message. Polling may actively sample electronic messages sent from user devices. Further, based on a user's input, the detection engine (602) may toggle electronic messages on or off such that an electronic message may or may not be detected.

The identification engine (604) identifies specific service identifiers in the electronic message. As mentioned above, specific service identifiers such as repeated parameters (214-

1, 214-2) on URL components are identified. Further, specific service identifiers in a MIME component are identified. Still further, specific service identifiers such as specific service identifiers in a body of the electronic message are identified. Even still further, specific service identifiers such as a user selected area of a specific service identifier are identified.

The association engine (606) associates an embedding gadget with an electronic message. As mentioned above, an embedding gadget may include a general gadget for a specific circumstance into the electronic message base on the electronic message. Further, an embedding gadget may include a general gadget from a library designed for a wide variety of electronic messages into the electronic message. As a result, an embedding gadget is associated with an electronic message.

The modification engine (608) modifies the electronic message based on the embedding gadget. The modification engine (608) may modify the electronic message such that the electronic message may include a modified MIME type. The modification engine (608) may modify the electronic message such that the electronic message may include a specific service identifier. The modification engine (608) may modify the electronic message such that the electronic message may include replacing the body of the electronic message with a URL pointing to the embedding gadget associated with the electronic message and the specific service identifier.

The policy engine (610) determines functionality for embedding actionable content in electronic communication. Further, the policy engine (610) may use a mobile interface instead of an embedding gadget. The policy engine (610) may determine an embedding gadget is to be cached on a user device. The policy engine (610) may archive an electronic message, remove a payload in the electronic message, or insert a specific service identifier in the electronic message.

The transmission engine (612) transmits the modified message to the recipients of the electronic message. In one example, the transmission engine (612) transmits the modified electronic message to a specific user device. In another example, the transmission engine (612) transmits the modified electronic message to an email server. The email server receives the modified electronic message. In this example, the email server stores, in memory, the modified electronic message. A user may access the modified electronic message using a user device as described above. As a result, the embedding system (600) allows a user to interact with embedded file within the electronic message.

Figure 7:
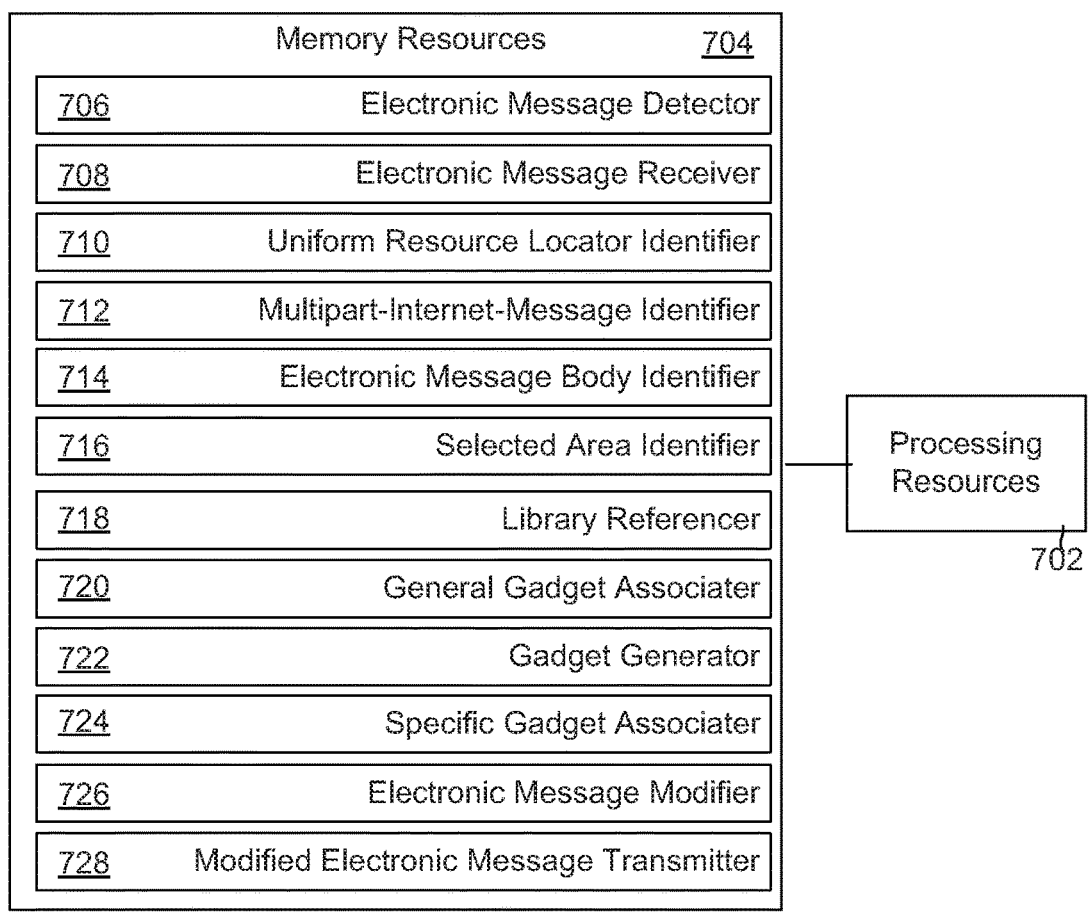
FIG. 7 is a diagram of an example of an embedding system, according to the principles described herein.

FIG. 7 is a diagram of an example of an embedding system (700), according to the principles described herein. In this example, the embedding system (700) includes processing resources (702) that are in communication with memory resources (704). Processing resources (702) include at least one processor and other resources used to process programmed instructions. The memory resources (704) represent generally any memory capable of storing data such as programmed instructions or data structures used by the embedding system (700). The programmed instructions shown stored in the memory resources (704) include an electronic message detector (706), an electronic message receiver (708), a uniform resource locator identifier (710), a multipurpose internet mail extension identifier (712), an electronic message body identifier (714), a selected area identifier (716), a library reference (718), a general gadget associater (720), an embedding gadget generator (722), a specific gadget associater (724), an electronic message modifier (726), and a modified electronic message transmitter (728).

The memory resources (704) include a computer readable storage medium that contains computer readable program code to cause tasks to be executed by the processing resources (702). The computer readable storage medium may be tangible storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The electronic message detector (706) represents programmed instructions that, when executed, cause the processing resources (702) to detect that an electronic message has been sent to a recipient. The electronic message receiver (708) represents programmed instructions that, when executed, cause the processing resources (702) to receive the electronic message. The uniform resource locator identifier (710) represents programmed instructions that, when executed, cause the processing resources (702) to identify URL's in the electronic message. The multi-purpose internet mail extension identifier (712) represents programmed instructions that, when executed, cause the processing resources (702) to identify MIME's in the electronic message. The electronic message body identifier (714) represents programmed instructions that, when executed, cause the processing resources (702) to identify a body in the electronic message. The selected area identifier (716) represents programmed instructions that, when executed, cause the processing resources (702) to identify a selected area in the electronic message. The library reference (718) represents programmed instructions that, when executed, cause the processing resources (702) to reference a library. The general gadget associater (720) represents programmed instructions that, when executed, cause the processing resources (702) to associate a general gadget to an electronic message. The embedding gadget generator (722) represents programmed instructions that, when executed, cause the processing resources (702) to generate an embedding gadget. The specific gadget associater (724) represents programmed instructions that, when executed, cause the processing resources (702) to associate a specific gadget to an electronic message. The electronic message modifier (726) represents programmed instructions that, when executed, cause the processing resources (702) to modifier the electronic message based on an embedding gadget. The modified electronic message transmitter (728) represents programmed instructions that, when executed, cause the processing resources (702) to transmit a modified electronic message.

Further, the memory resources (704) may be part of an installation package. In response to installing the installation package, the programmed instructions of the memory resources (704) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (702) and the memory resources (704) are located within the same physical component, such as a server, or a network component. The memory resources (704) may be part of the physical component's main memory, caches, registers, non-volatile memory, or elsewhere in the physical component's memory hierarchy. Alternatively, the memory resources (704) may be in communication with the processing resources (702) over a network. Further, the data structures, such as the libraries, may be accessed from a remote location over a network connection while the programmed instructions are located locally. Thus, the embedding system (700) may be implemented on a user device, on a server, on a collection of servers, or combinations thereof.

The embedding system (700) of FIG. 7 may be part of a general purpose computer. However, in alternative examples, the embedding system (700) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

What is claimed is:

1. A non-transitory computer readable medium for embedding actionable content in an electronic communication, comprising computer readable program code, the computer readable program code comprising program instructions that, when executed, causes a processor to:
   modify an electronic message, wherein modification of the electronic message comprises:
      embedding content associated with actionable content from a network into the body of the electronic message by replacing at least a portion of a body of the electronic message with user-interactionable content and a specific service identifier; and
      responsive to a user selection of the user-interactionable content, presenting the user-interactionable content in the electronic message without navigating away from the electronic message, wherein the user-interactionable content comprises functionality within the electronic message based on the content retrieved from the network.

2. The non-transitory computer readable medium of claim 1, wherein the non-transitory computer readable medium is a specific gadget embedded for a specific circumstance into the electronic message based on the electronic message.

3. The non-transitory computer readable medium of claim 1, wherein the non-transitory computer readable medium is a general gadget from a library of multiple embedding gadgets available for a number of electronic messages.

4. The non-transitory computer readable medium of claim 3, wherein the general gadget comprises a program application written for a variety of electronic messages.

5. An embedding system comprising at least a processor and a memory for storing computer readable program code, the computer readable program code comprising program instructions that, when executed, causes the processor to:
   associate an embedding gadget with an electronic message, the embedding gadget being generated by the embedding system based on a determination that the electronic message is dissimilar from a number of previously-sent electronic messages; and
   modify the electronic message based on the embedding gadget, wherein modifying the electronic message based on the embedding gadget includes replacing at least a portion of a body of the electronic message with actionable content and a specific service identifier.

6. The embedding system of claim 5, wherein the modification of the electronic message is performed before receipt of the electronic message by a recipient.

7. The embedding system of claim 5, wherein the embedding gadget is based on a form of the actionable content.

8. The embedding system of claim 5, wherein the embedding gadget is cached on a client device.

9. The embedding system of claim 5, wherein associating the embedding gadget with the electronic message comprises embedding a specific gadget for a specific circumstance into the electronic message based on the electronic message.

10. The embedding system of claim 5, wherein associating the embedding gadget with the electronic message comprises embedding a general gadget from a library of multiple embedding gadgets available for a number of electronic messages into the electronic message.

11. The embedding system of claim 5, wherein the specific service identifier comprises a unique identifier among all other identifiers used for electronic messages.

12. The embedding system of claim 5, wherein modifying the electronic message based on the embedding gadget comprises replacing at least a portion of a portion of the body of the electronic message with a uniform resource locator (URL) pointing to the embedding gadget.

13. A method for embedding actionable content in electronic communication, comprising:
   generating an embedding gadget using an embedding gadget generator based on a determination that the electronic message is dissimilar from a number of previously-sent electronic messages;
   associating the embedding gadget with an electronic message, the associating the embedded gadget comprising replacing at least a portion of the body of the electronic message with actionable content and a specific service identifier identified in the electronic message, wherein the specific service identifier comprises a unique identifier among all other identifiers used for electronic messages; and modifying the electronic message based on the embedding gadget.

14. The method of claim 13, further comprising detecting that the electronic message has been sent to a recipient.

15. The method of claim 14, wherein detecting that the electronic message has been sent to the recipient comprises determining attributes in the electronic message to verify if the attributes in the electronic message are service mail message attributes.

16. The method of claim 15, wherein the attributes of the service mail messages comprises the electronic message indicating in a header or in a footer in a body of the electronic message that the electronic message is a service mail message, a return-to function in the electronic message is unaddressed or set to other email addresses, a lookup table that comprises the service mail message for the electronic message, templates such as set and repeated formats in the electronic message, and combinations thereof.

17. The method of claim 13, wherein identifying the specific service identifiers in the electronic message comprises repeated parameters on uniform resource locator (URL) components, specific service identifiers in a multipart-internet-message (MIME) component, specific service identifiers in a body of the electronic message, a user selected area of the specific service identifier, or combinations thereof.

18. The method of claim 13, wherein associating the embedding gadget with the electronic message comprises embedding a general gadget from a library of multiple embedding gadgets available for a wide variety of electronic messages into the electronic message or embedding a specific gadget embedded for a specific circumstance into the electronic message.

19. The non-transitory computer readable medium of claim 1, wherein the actionable content is a task for a user.

20. The non-transitory computer readable medium of claim 1, wherein the electronic message is modified after a user indicates the electronic message is to be sent.

* * * * *